United States Patent Office

3,318,659
Patented May 9, 1967

3,318,659
PROCESS OF TREATING CELLULOSE TEXTILES WITH POLYVINYL CHLORIDE POLYMERS, A POLYSILOXANE AND ZIRCONIUM ACETATE AND OPTIONALLY WITH FLAME RESISTANT AND ROT RESISTANT AGENTS
Joel B. Bullock and Clark M. Welch, New Orleans, La., assignors to the United States of America as represented by the Secretary of Agriculture
No Drawing. Filed Nov. 14, 1962, Ser. No. 237,766
4 Claims. (Cl. 8—115.6)

A non-exclusive, irrevocable, royalty-free license in the invention herein described, throughout the world for all purposes of the United States Government, with the power to grant sublicenses for such purposes, is hereby granted to the Government of the United States of America.

This invention relates to the formulation and application of a light weight coating for cellulosic textiles which imparts to such textiles improved water-repellency and weather-resistance. In general, this invention relates to the application of aqueous emulsions of polyvinyl chloride, methyl hydrogen polysiloxane and zirconium acetate to cellulosic textiles.

It is an object of the present invention to improve the water-repellency and weather-resistance of cellulosic textile materials such as cotton, rayon, ramie and flax, without adversely affecting the hand, drape, strength and other textile properties. A further object is to improve the stability and durability to weathering of phosphorus-containing resins applied as flame retardants to cellulosic textiles. The coatings of this invention are found to protect phosphorus-containing resin finishes from the action of sunlight, air, rain, and other agencies of weathering while imparting water repellency and maintaining the desirable properties of flame resistance and rot resistance imparted by the resins.

It is now well known that highly flame-resistant cellulosic fabrics can be prepared by the formation of certain phosphorus-containing polymers in the fabrics. The copolymers of tris(1-aziridinyl) phosphine oxide, hereinafter abbreviated as APO, with tetrakis (hydroxymethyl) phosphonium chloride, abbreviated as THPC, impart a high degree of flame resistance and rot resistance, when such copolymers are made using APO/THPC monomer ratios of 0.1:1 to 20:1. The zinc fluoroborate-catalyzed polymerization of APO on cellulosic textiles also imparts these properties. The copolymers of THPC with trimethylolmelamine and urea have a similar action. A serious disadvantage of such phosphorus-containing polymers and copolymers is their limited stability under outdoor weathering conditions. Within 3–11 months of continuous exposure, these resin finishes are degraded photochemically and oxidatively, and the degradation products are leached out of the cellulosic substrate. The loss of resin is evidenced by a loss of flame retardancy and rot resistance, and may be quantitatively followed by measuring the decreases in nitrogen and phosphorus content. Such losses are a handicap in the use of these resins in tents, tarpaulins, drapery, awnings, certain types of clothing and other items exposed to sunlight and rain, or sunlight and laundering, for extended periods.

The service life of flame resistant fabrics thus depends on two factors—the life of the flame retardant and the life of the fabric. The cellulosic material of the textile itself undergoes considerable weathering degradation in 8–12 months, as evidenced by loss of tensile and tearing strength, the loss of abrasion resistance, and the destruction caused by microorganisms. By materially reducing the effects of weathering on both the cellulose and the phosphorus-containing resin, the coatings of this invention increase the retention of strength, flame resistance and mechanical integrity of the textile during outdoor exposure.

The polyvinyl chloride emulsion utilized in the present process may be made from polymers of vinyl chloride or from copolymers of vinyl chloride with alkyl acrylates or maleates. As is well known, the acrylates impart to the copolymer the ability to form flexible films. Other plasticizers and emulsifiers may be included to increase the softness and pliability of the finish or to stabilize the latex prior to its application. The function of the polyvinyl chloride is (1) to decrease the accessibility of the cellulosic textile material to oxygen, ozone, peroxides and other destructive atmospheric agents, (2) to act as a binder to decrease the loss of flame retardant resins which have been applied to the textile, and which are gradually removed through the joint action of rain or laundering, (3) to impart rapid-drying characteristics to the cellulosic textile, and (4) to increase the flame-resistance of the textile.

The methyl hydrogen polysiloxanes utilized in the process may be prepared by the hydrolysis of monomethyl dihalogenosilanes such as $CH_3SiHCl_2$, or mixtures of these with dimethyl monohalogenosilanes such as $$(CH_3)_2SiHCl$$

as described for example by Norton, U.S. Patent 2,386,259. The resulting polysiloxanes have such structures as

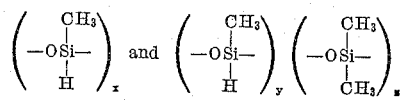

The function of these polysiloxanes in the coatings of the present invention is to serve as an efficient water repellent, and to eliminate the stiffness which results from the use of polyvinyl chloride by itself.

The zirconium acetate included in the formulations is found to serve two functions. (1) It acts as an efficient curing agent for the methyl hydrogen polysiloxane, causing the reactive hydrogen atoms of the latter to undergo reaction with cellulosic hydroxyl groups and with water present, giving attachment of the polysiloxane to cellulose molecules and also forming crosslinks in the polysiloxane to produce a durable finish.

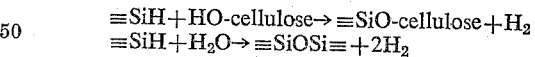

(2) The zirconium acetate reacts with water during heat curing to form polymeric zirconium oxides which contribute further to water repellency.

Although polyvinyl chloride has been widely used in coatings designed to afford weathering protection to textiles, the amounts required have been of the order of 35–80% of the weight of the treated textile material. This has resulted in stiff, heavy fabrics unsuitable for clothing, readily movable tents, tarpaulins and drapery. Even when used in small amounts, polyvinyl chloride applied in the absence of the polysiloxane causes undue stiffness. This is observed even when preplasticized polyvinyl chloride-alkyl acrylate copolymers are used. The process of the present invention gives coatings which offer protection from weathering at add-ons of 5–10%, and which result in a soft, pliable fabric or yarn. The incorporation of polyvinyl chloride, methyl hydrogen polysiloxane and zirconium acetate in a stable emulsion or latex, and the application of such an emulsion to cellulosic textiles has not hitherto been described. Further novel and unexpected features arise when the coatings are applied to cellulosic textiles which have been resin-finished with phosphorus-containing polymers or copolymers such as those from APO or APO-THPC. The water repellency of such combination finishes is high, and is more durable to weathering than the water repellency obtained by coating fabric which has not been resin-finished with APO or APO-THPC. This is surprising since neither the APO nor APO-THPC finishes exhibit any water repellency. The latter are more accurately classed as hydrophilic finishes than as hydrophobic finishes. Moreover the application of the coatings causes even less loss in strength in APO-THPC resin-treated fabrics than in untreated fabrics, and there is no strength loss whatever in coating APO-treated fabrics. Even though the coatings of this invention impart no rot resistance to untreated fabric, they are highly effective in increasing the durability to weathering of rot resistance imparted by APO or by APO-THPC resin finishes.

The emulsions of this invention may be prepared by dispersing the methyl hydrogen polysiloxane in water and adding the dispersion to an aqueous emulsion of the vinyl chloride polymer or copolymer. The mixture is then agitated in a blendor. The zirconium acetate in dilute aqueous solution is preferably added last, and the mixture is again vigorously agitated in a blendor. Addition of solutions of zirconium acetate directly to polyvinyl chloride emulsions may cause irreversible coagulation of the latter, especially if the concentration of zirconium acetate in the resulting mixture is greater than 8%. The concentration of the vinyl chloride polymer or copolymer in the final mixture may be in the range of 1–20% by weight, the optimum combinations of weathering protection, fabric suppleness and fabric weight being obtained at concentrations of 3–10%. The methyl hydrogen polysiloxane may be present in a concentration of 1–20% by weight, with concentrations of 3–10% being preferred. The zirconium acetate concentration in the final emulsion may be varied in the range 0.5–8%, with concentrations of 1.5–5% by weight giving optimum emulsion stability, and curing properties. The use of too high a concentration of the zirconium acetate in the mixture causes APO-THPC resin-treated fabric to exhibit afterglow when charred. Anionic or nonionic emulsifiers may be used to stabilize the emulsion. These are preferably added to the vinyl chloride polymer or copolymer in the preparation of the initial emulsion used as an ingredient in the above mixture. Such emulsifiers as sodium lignosulfonate, sodium alkylarylsulfonates, ammonium oleate or alkylarylpolyether alcohols are suitable. Emulsions stable for several days are readily prepared.

The application of the treating mixture to cellulosic textiles may be carried out by wetting the fiber, yarn or fabric in the emulsion, and heat-curing the textile material at 80–170° C. for 1–10 minutes. Alternatively the fiber, yarn or fabric may be wet in the treating emulsion, dried at 25–110° C., and subsequently cured at 80–180° C. for 1–10 minutes.

To evaluate the water repellency of the coated fabrics the AATCC Standard Test Method 22–1961 was used. The numerical ratings obtained are referred to as spray ratings, complete water repellency being given a value of 100.

The outdoor weathering of the fabrics was carried out on wooden racks, facing south, at an angle of 45° to the horizontal. The lower edge of the frames was about 30 in. above the ground. Tests for rot resistance were carried out by burial of the fabrics in manure-inoculated soil, as specified in AATCC Standard Test Method 30–1957 T, Section I–B–3.

APO-THPC resin-treated fabrics were prepared by the method of Drake, Reeves and Chance, U.S. Patent 2,886,539. The procedure used involved padding the fabric using 2 dips, 2 nips to a wet pickup of 70–80% with varying mole ratios of APO/THPC, the solids content of the treating bath being 30% by weight. The fabrics were dried 4–6 minutes at 80–85°, cured 4–6 minutes at 155° C., washed in hot water for 45 minutes, dried, and equilibrated with air at ordinary humidity. APO resin-treated fabric was prepared as described in U.S. patent application, Ser. No. 783,999, filed Dec. 30, 1958, by Drake, Guthrie, Chance and Reeves now abandoned, using a solution containing 25% APO and 1.75% zinc fluoborate. The manner of processing was the same as for APO-THPC.

The following examples are given by way of illustration and not by way of limitation. All parts and percentages are by weight. Polyvinyl chloride concentrations are expressed in percentages of dry resin by weight.

EXAMPLE 1

A sample of bleached 6.5 oz. white twill was padded with an emulsion containing 5% vinyl chloride-alkyl acrylate copolymer (weight ratio of vinyl chloride/alkyl acrylate—60:40; dry resin density—1.27) 5% methyl hydrogen polysiloxane and 2% zirconium acetate to a wet pick up of 67%. The fabric was then dried 6 min. at 80–85° C. and cured 4 min. at 155° C. After being washed, dried and equilibrated, the fabric had an add on of 5.2%. The breaking strength loss was 11%. The fabric had a spray rating of 100. After weathering for 3 months, the fabric had a spray rating of 50. Uncoated fabric had a spray rating of 0, before and after weathering. After 6 months of outdoor weathering the coated fabric retained 69% of its original strength and the uncoated fabric only 52% of its original strength. After 12 months' outdoor exposure of the coated fabric retained 53% of its original strength and the control fabric only 35% of its original strength.

EXAMPLE 2

A sample of 6.5 oz. white twill was treated with APO-THPC in a 1:1 mole ratio, to give a fabric having 17.8% add on of resin and containing 1.92% nitrogen and 2.77% phosphorus.

A coating was applied to this fabric from an emulsion of 5% vinyl chloride-acrylate copolymer (weight ratio of vinyl chloride/alkyl acrylate—60:40; dry resin density—1.27) 5% methyl hydrogen siloxane and 2% zirconium acetate by padding, drying 6 min. at 80–85° C., curing 4 min. at 155° C., washing and drying. The weight of this coating was 5.9% of the original treated fabric weight. The breaking strength loss due to the coating process was 10%. The spray rating was 80. After 6 months' outdoor weathering, the uncoated fabric had lost 52% of its original strength and the coated fabric had lost 35% of its original strength. Losses of nitrogen after 6 months' exposure were 47% on the uncoated and 34% on the coated. Losses of phosphorus were 52% on the uncoated and 37% on the coated. After 12 months' outdoor exposure, the coated fabric retained 50% of its original strength and the uncoated fabric only 33% of its strength. Nitrogen retention on the coated fabric was 54% and 36% on the uncoated. Phosphorus retention was 51% on the coated fabric and 27% on the uncoated fabric. The coated fabric had an initial spray rating of 80, but after 6 months' outdoor exposure this was reduced to 50. The uncoated flame resistant fabric had no water repellency.

Soil burial tests on the fabrics after 6 months' outdoor weathering showed the uncoated flame proofed fabric rotted completely in 2 weeks, but the coated fabric required 14 weeks to rot. The unweathered uncoated fabric remained intact in the rot beds for 21 weeks, and the coated fabric remained intact for more than 44 weeks.

EXAMPLE 3

A sample of white 6.5 oz. twill was treated with APO-THPC in a 2:1 mole ratio to a resin add on of 21.1% and a nitrogen content of 2.63% and phosphorus content of 2.94%. This fabric was then coated with 5% of the vinyl chloride-alkyl acrylate copolymer of Example 1, 5% methyl hydrogen siloxane and 2% zirconium acetate to an add-on of 6.5%. The breaking strength loss due to coating was 4%. After 6 months' outdoor weathering the coated fabric retained 77% of its original strength and the uncoated retained 69%. Phosphorus losses were 22% on the coated fabric and 42% on the uncoated fabric. Nitrogen losses were 24% on the coated fabric and 31% on the uncoated.

The uncoated fabric had no water repellency. The coated fabric initially had a spray rating of 80 and after 6 months' outdoor exposure had a spray rating of 50.

EXAMPLE 4

A sample of white 6.5% twill was treated with APO-THPC in a 3:1 mole ratio to a resin add on of 20.8%. This fabric was then after coated with 5% of the vinyl chloride-alkyl acrylate copolymer of Example 1, 5% methyl hydrogen siloxane and 2% zirconium acetate to an add on of 7.6%. The breaking strength loss during coating was 6%.

These two fabrics were then buried in active rot beds with frequent checking. A fabric was considered rotted when the 1 in. strips were no longer intact or had disintegrated. The uncoated fabric rotted in 35 weeks while the coated fabric still retained much of its strength after 44 weeks.

EXAMPLE 5

A sample of 6.5 oz. white twill was treated with APO-THPC in a 4:1 mole ratio to give a resin add on of 18.8%. This fabric contained 2.80% nitrogen and 2.68% phosphorus. It had no water repellency.

A sample of this fabric was then coated, by impregnation with an emulsion of 5% vinyl chloride-alkyl acrylate copolymer (Example 1), 5% methyl hydrogen polysiloxane and 2% zirconium acetate, drying 6 min. at 80–85° C. and curing 4 min. at 155° C. After the fabric was washed, dried and equilibrated, the coating had added 6.5% to the total fabric weight. The breaking strength loss from the coating process was 4%. The fabric now contained 2.66% nitrogen and 2.45% phosphorus, and had a spray rating of 100.

The coated and uncoated fabrics were weathered outdoors for 6 months. The coated fabric retained a spray rating of 50. Strength losses on the coated fabric were 25% and on the uncoated fabric 35%. After 12 months' exposure the coated fabric retained 54% of its original strength and the uncoated APO-THPC treated fabric retained only 40% of its original strength.

EXAMPLE 6

A sample of 6.5 oz. white twill was treated with APO-Zn(BF$_4$)$_2$ to give a flame resistant fabric with 18.3% add on, 3.18% nitrogen and 2.47% phosphorus. This fabric was then coated from an emulsion of 5% vinyl chloride-alkyl acrylate copolymer (Example 1), 5% methyl hydrogen siloxane and 2% zirconium acetate, causing a weight gain of 5.9%. The coated fabric had a spray rating of 100. The breaking strength was the same as for the uncoated fabric.

After 6 months of outdoor weathering the uncoated fabric retained 64% of its original strength and the coated fabric retained 83% of its original strength. The coated fabric lost only 17% of the phosphorus from the flame resistant resin finish while the uncoated fabric lost 31% of its phosphorus during the same 6-month exposure period.

When subjected to soil burial tests the coated fabric retained much of its strength after 44 weeks whereas the uncoated fabric rotted in 35 weeks.

EXAMPLE 7

A sample of 6.5 oz. white twill was treated with APO-THPC in a 1:1 mole ratio to give a fabric having 18.9% add-on of resin, and containing 2.28% nitrogen and 3.27% phosphorus.

A coating was applied to this fabric from an emulsion of 5% unplasticized, uncompounded polyvinyl chloride (dry resin density—1.36), 5% methyl hydrogen polysiloxane and 2% zirconium acetate by padding, drying 6 min. at 80–85° C., curing 4 min. at 155° C., washing and drying. The weight of the coating was 6.9% of the original treated fabric weight. The coated fabric had a spray rating of 80. It exhibited a softer and more supple hand than did APO-THPC resin-treated fabric alone.

We claim:
1. A process for rendering cellulose textiles water-repellent and weather resistant which process comprises wetting the cellulose textile with an aqueous emulsion containing from 1–20% by weight of a resin selected from the group consisting of polyvinyl chloride and copolymers of vinyl chloride predominating in vinyl chloride, from 1–20% by weight of methyl hydrogen polysiloxane, and from 0.5–8% of zirconium acetate, and subsequently dry curing the emulsion wetted cellulose textile at temperatures from 80–180° C. for from 1–10 minutes, the shorter time intervals being employed with the higher temperatures.

2. A process for treating cellulose textiles which previously have been rendered flame- and rot-resistant with tris(1-aziridinyl)phosphine oxide applied to said textile and dry cured thereon by heating, which process comprises wetting the flame-proofed and rot-proofed cellulose textile with an aqueous emulsion containing from 1–20% by weight of a resin selected from the group consisting of polyvinyl chloride and copolymers of vinyl chloride predominating in vinyl chloride, from 1–20% by weight of methyl hydrogen polysiloxane, and from 0.5–8% of zirconium acetate, and subsequently dry curing the wetted cellulose textile at temperatures from 80–180° C. for from 1–10 minutes, the shorter time intervals being employed with the higher temperatures.

3. A process for treating cellulose textiles which have previously been rendered flame- and rot-resistant with a combination of tris(1-aziridinyl)phosphine oxide and tetrakis(hydroxymethyl)phosphonium chloride applied to said textile and dry cured thereon by heating, which process comprises wetting the flame-proofed and rot-proofed cellulose textile with an aqueous emulsion containing from 1–20% by weight of a resin selected from the group consisting of polyvinyl chloride and copolymers of vinyl chloride predominating in vinyl chloride, from 1–20% by weight of methyl hydrogen polysiloxane, and 0.5–8% of zirconium acetate, and subsequently dry curing the wetted cellulose textile at temperatures from 80–180° C. for from 1–10 minutes, the shorter time intervals being employed with the higher temperatures.

4. A process for treating cellulose textiles which have previously been rendered flame- and rot-resistant by treatment with tris(1-aziridinyl)phosphine oxide and tetrakis-(hydroxymethyl)phosphonium chloride applied to said textile and dry cured thereon by heating, the mole ratio of tris(1-aziridinyl)phosphine oxide to the tetrakis(hydroxymethyl)phosphonium chloride being from 0.1:1 to 20:1, which process comprises wetting the flame-proofed and rot-proofed cellulose textile with an emulsion containing from 1–20% by weight of a resin selected from the group consisting of polyvinyl chloride and copolymers of vinyl chloride predominating in vinyl chloride, from 1–20% by weight of methyl hydrogen polysiloxane, and from 0.5–8% of zirconium acetate, and subsequently dry-curing the emulsion wetted cellulose textile at temperatures from 80–180° C. for from 1–10 minutes, the shorter time intervals being employed with the higher temperatures.

References Cited by the Examiner

UNITED STATES PATENTS

| | | |
|---|---|---|
| 2,334,236 | 11/1943 | Arnold et al. |
| 2,789,956 | 4/1957 | Eder. |
| 2,860,074 | 11/1958 | Hedlund _____ 117—161 X |
| 2,886,472 | 5/1959 | Condo et al. |
| 2,886,539 | 5/1959 | Drake et al. _____ 117—136 X |
| 2,891,877 | 6/1959 | Chance et al. |
| 2,911,325 | 11/1959 | Drake et al. |
| 3,054,698 | 9/1962 | Wagner. |
| 3,087,836 | 4/1963 | Dearborn _____ 117—136 |

FOREIGN PATENTS 1,089,817  10/1954  France.

OTHER REFERENCES

Connor et al., Textile Research Journal, March 1960, pages 170–178.

Drake et al. (3), American Dyestuff Reporter, Feb. 20, 1961, pages 27–32.

Beninate et al., American Dyestuff Reporter, May 28, 1962, pages 29–33.

NORMAN G. TORCHIN, *Primary Examiner.*

J. TRAVIS BROWN, H. WOLMAN,
*Assistant Examiners.*